United States Patent
Sokolov et al.

(10) Patent No.: US 9,701,900 B2
(45) Date of Patent: Jul. 11, 2017

(54) METHODS AND SYSTEMS FOR THE SYNTHESIS OF ULTRABRIGHT FLUORESCENT SILICA PARTICLES CAPABLE OF MEASURING TEMPERATURE

(71) Applicants: Igor Sokolov, Medford, MA (US); Vivekanand Kalaparthi, Medford, MA (US); Shajesh Palantavida, Woburn, MA (US)

(72) Inventors: Igor Sokolov, Medford, MA (US); Vivekanand Kalaparthi, Medford, MA (US); Shajesh Palantavida, Woburn, MA (US)

(73) Assignee: CLARKSON UNIVERSITY, Potsdam, NY (US)

( * ) Notice: Subject to any disclaimer, the term of this patent is extended or adjusted under 35 U.S.C. 154(b) by 0 days.

(21) Appl. No.: 13/970,251

(22) Filed: Aug. 19, 2013

(65) Prior Publication Data

US 2014/0051868 A1   Feb. 20, 2014

Related U.S. Application Data

(60) Provisional application No. 61/684,326, filed on Aug. 17, 2012.

(51) Int. Cl.
*C09K 11/06* (2006.01)
(52) U.S. Cl.
CPC .................... *C09K 11/06* (2013.01)
(58) Field of Classification Search
None
See application file for complete search history.

(56) References Cited

U.S. PATENT DOCUMENTS

| 5,480,582 A | 1/1996 | Pope |
| 7,754,646 B2 * | 7/2010 | Trau ............... C08G 77/06 428/405 |

(Continued)

FOREIGN PATENT DOCUMENTS

| WO | 2004081222 | 9/2004 |
| WO | 2005023961 | 3/2005 |

(Continued)

OTHER PUBLICATIONS

Naik et al., "Ultrabright Fluorescent Silica Particles: Physical Entrapment of Fluorescent Dye Rhoidamine 640 in Nanochannels", Department of Physics and Chemistry, Clarkson University, American Chemical Society, 2008, pp. 214-224.

(Continued)

*Primary Examiner* — Jeffrey Washville
(74) *Attorney, Agent, or Firm* — Bond, Schoeneck & King, PLLC; Blaine Bettinger; George McGuire

(57) ABSTRACT

Ultrabright fluorescent silica particles that can take stable temperature measurements, and methods of their manufacture. The particles have encapsulated fluorescent substances, some of which can exhibit altering fluorescent characteristics depending on temperature. The particles function as a thermometer allowing one to measure the temperature of the environment. A ratio of the fluorescent peaks in the fluorescent spectrum of each particle depends on temperature, but is dependent on neither the amount of exciting light nor the size of the particles. Further, the particle size can be confined to the range of 8 nm to 100 μm.

11 Claims, 5 Drawing Sheets

(56) References Cited

U.S. PATENT DOCUMENTS

| | | | |
|---|---|---|---|
| 8,206,328 B2 | 6/2012 | Adamson | |
| 2007/0026407 A1 | 2/2007 | Matsumoto et al. | |
| 2007/0196656 A1* | 8/2007 | Rowell | C09C 1/3081 428/403 |
| 2007/0292676 A1* | 12/2007 | Naigertsik | A01N 25/28 428/321.5 |
| 2010/0297545 A1* | 11/2010 | Yoo | B82Y 30/00 430/108.3 |

FOREIGN PATENT DOCUMENTS

| | | |
|---|---|---|
| WO | 2006133519 | 12/2006 |
| WO | 2007044711 | 4/2007 |

OTHER PUBLICATIONS

MacCraith et al., "Enhanced Fluorescence Sensing Using Sol-Gel Materials", Journal of Fluorescence, vol. 12, Nos. 3/4, Dec. 2002, pp. 333-342.

Naik et al. "Synthesis of Mesoporous Silica Fibers and Discoid Endowed with Circular Pore Architecture using Disodium Triozosilicate as Silica Source", Microporous and Mesoporous Materials Elsevier vol. 116, 2008, pp. 581-585.

Kobler et al., Colloidal Suspensions of Functionalized Mesoporous Silica Nanoparticles, American Chemical Society, vol. 2, Nov. 4, 2008, pp. 791-799.

Blaaderen et al., "Synthesis and Characterization of Colloidal Dispersions of Fluorescent, Monodisperse Silica Spheres", Langmuir 1992, pp. 2921-2931.

Kreuter, "Nanoparticles and Microparticles for Drug and Vaccine Delivery", J. Anat. vol. 189, 1996, pp. 503-505.

Yang et al., "Formation of Hollow Helicoids in Mosoporous Silica: Supramolecular Origami", Adv. Mater, 1999, 11, No. 17, pp. 1427-1431.

Sokolov and Kievsky, "3D Design of self-addembled nanoporous colloids", Studies in Surface and Catalysis, 156, 2005, pp. 433-442.

Sokolov et al., "Self-Assembly of Ultrabright Fluorescent Silica Particles", Small, 3, pp. 419-423, Jan. 24, 2007.

* cited by examiner

METHODS AND SYSTEMS FOR THE SYNTHESIS OF ULTRABRIGHT FLUORESCENT SILICA PARTICLES CAPABLE OF MEASURING TEMPERATURE

CROSS-REFERENCE TO RELATED APPLICATIONS

This application claims priority to U.S. Provisional Patent Application Ser. No. 61/684,326, filed on Aug. 17, 2012 and entitled "Synthesis of ultrabright fluorescent silica particles working capable of measuring temperature," the entire disclosure of which is incorporated herein by reference.

BACKGROUND

The present invention relates to temperature measurement and, more particularly, to composite particles for temperature measurement applications.

The dependence of optical spectra of various molecules on temperature of the environment, known as thermochromism, is a well-known phenomenon. The most common thermochromic materials are liquid crystals and dyes. Thermochromic liquid crystals are different colors at different temperatures because of the selective reflection of specific wavelengths of light from their structures. Thermochromic liquid crystals can have a versatile range of colors and useful color changes between −30 and 120° C., often with very high but narrow temperature sensitivity. Thermochromic dyes are usually leuco dyes ("white dyes") to indicate that, in some conditions, they are colorless. Microencapsulation of thermochromic materials provides an additional advantage of having combinations of several thermochromic dyes, results in several rather narrow color ranges, as well as protection of the coloring agent from the environment. The thermochromic materials are used in inks, paints, papers, etc., which are utilized in a variety of applications, from food to sensors. Thermochromic materials are commonly used to visualize temperature qualitatively. Quantitative measurements are also possible, in particular, using thermochromic liquid crystals. The accuracy of temperature measurement with liquid crystals is the subject of debate. An accuracy of 1° C. with a sensitivity of 0.1° C. for the range of −40-283° C. may be possible. However, the accuracy relative to the measurement range is not great.

A two-color version of a Laser Induced Fluorescence Thermometry technique has been proposed in which two fluorescent dyes are used to map a 3D volume distribution of temperatures. One dye is used as the sensitive probe dye and the other dye as a reference dye to compensate the variation of the incident light. The ratio of the fluorescence intensities of these dyes is calibrated against the temperature to eliminate the effect of the fluctuation of illuminating light intensity (including fluctuation in the background noise from the incident laser). It was found that the uncertainty of the method (to 95% confidence) was approximately 0.1° C. The relative accuracy of this method is higher than that of the thermochromic liquid crystals method because it allows a wider range of variation of the temperature. Typically the accuracy is ~1.5° C. over a measurement range of 40° C. or more.

The major disadvantage of this technique, however, is the inevitable contamination of the media being measured with the dyes, which are typically toxic. In phase separated medium the dyes can also be separated to some degree if they interact differently with the phases. However, this makes it impractical to use this technique for such media.

Accordingly, there is a continued need for micro- and nano-sized thermometer with a good accuracy compared to thermochromic crystals.

Progress in the development of nanoscale materials and processes has created a demand for better understanding of thermal transport in nanoscale devices, structures, and materials, as well as biological tissues. This understanding will be important for the development of a new generation of energy materials, powerful nanoelectronic devices, the development of new cancer treatments, microfluidics, the study of air flows in environmental science, and much more. Typically, the nanoscale devices and materials are too large to be suitable for the first-principle (atomistic) calculations. Therefore, the modeling of thermal transport for such devices and materials relies mostly on solutions of the Boltzmann transport equation. The approach, however, requires knowledge of phonon scattering rates at the nanoscale, which is poorly known. Direct measurement of the thermal transport down to the nanoscale could greatly accelerate this area of research. This can be done with the help of "micro-thermometers" and "nano-thermometers," devices/particles that "measure" the temperature of the environment in micro/nano scales in a fast, reliable, and minimally disturbing way.

Optical measurements offer an attractive remote way of measuring temperature. Some optically accessed molecules and particles can be used to measure the temperature based on their fluorescence. For example, a few thermochromic dyes and pigments, along with some nanoparticles with dyes covalently bound, and liquid crystals are presently used to map the temperature in fluids. All those dyes and particulates have serious limitations including: (i) limited temperature sensitivity; (ii) a narrow working range of temperatures; (iii) that the temperature signal can be confused with a possible change of the medium chemistry; (iv) that the signal typically changes due to photobleaching; and (v) that the spectral range of such dyes/particles is rather limited. Accordingly, there is a continued need for the development of small fluorescent particles with photostable, environment independent fluorescence which will depend primarily on temperature.

BRIEF SUMMARY

Systems and methods for producing a temperature-sensitive fluorescent silica particle. According to one aspect is a method for producing a temperature-sensitive fluorescent silica particle comprising the step of encapsulating at least two different fluorescent dyes in a silica particle, wherein a ratio of fluorescent peaks in a fluorescent spectrum of the silica particle is dependent upon on ambient temperature.

According to an aspect, the step of encapsulating at least two different fluorescent dyes in a silica particle comprises the steps of: (i) creating a solution comprising a silica precursor and at least two different fluorescent dyes; and (ii) complexing the at least two different fluorescent dyes with the silica precursor to form the temperature-sensitive silica particle.

According to another aspect, the method further comprises the steps of: (i) removing any uncomplexed silica precursor and fluorescent dye from the solution after the complexing step; and (ii) dialyzing the temperature-sensitive silica particle.

According to one aspect, at least one of the two different fluorescent dyes is sensitive to a change in ambient temperature, and another of the two different fluorescent dyes is not sensitive to a change in ambient temperature.

According to another aspect the at least two different dyes are encapsulated utilizing a physical encapsulation process. Alternatively, the at least two different dyes are covalently bonded to the silica matrix.

According to one aspect, the at least two different fluorescent dyes are each a dye utilized for laser induced fluorescence thermometry. According to another aspect, the at least two different fluorescent dyes are each a dye utilized for Forster resonance energy transfer.

According to yet another aspect, the step of encapsulating at least two different fluorescent dyes in a silica particle utilizes a water-soluble silica source chosen from the family of either organic or inorganic silicates. For example, the silica source can be tetraethyl orthosilicate.

According to another aspect, the method comprises a structure-directing agent, wherein the structure-directing agent is a surfactant or amphiphilic co-polymer. For example, the structure-directing agent can be cetyltrimethylammonium chloride.

According to an aspect, the method further comprises the step of providing a silica co-source with excessive amount of hydrophobic groups. For example, the silica co-source can be triethanolamine.

According to another aspect, the dyes can be, for example, R6G (Rhodamine 6G) and RhB, (Rhodamine B), although many other dyes are possible.

According to an aspect is a method for producing a temperature-sensitive silica particle comprising the steps of: (i) creating a solution comprising a silica precursor, at least two different fluorescent dyes, and a structure-directing agent; (ii) complexing the at least two different fluorescent dyes with the silica precursor to form the temperature-sensitive silica particle; and (iii) removing any uncomplexed silica precursor and fluorescent dye from the solution; wherein at one of the at least two different dyes is R6G, and at least one of the two different dyes is RhB, and further wherein a ratio of fluorescent peaks in a fluorescent spectrum of the temperature-sensitive silica particle is dependent upon on ambient temperature.

According to another aspect, at least one of the at least two different fluorescent dyes is sensitive to a change in ambient temperature, and at least one of the at least two different fluorescent dyes is not sensitive to a change in ambient temperature.

According to an aspect is a temperature-sensitive fluorescent silica particle comprising at least two different fluorescent dyes in a silica particle, wherein a ratio of fluorescent peaks in a fluorescent spectrum of the silica particle is dependent upon on ambient temperature.

According to another aspect is a temperature-sensitive fluorescent silica particle, wherein at least one of the at least two different fluorescent dyes is sensitive to a change in ambient temperature, and at least one of the at least two different fluorescent dyes is not sensitive to a change in ambient temperature.

According to yet another aspect is the temperature-sensitive fluorescent silica particle, wherein each of the at least two different fluorescent dyes are covalently bonded to a silica matrix.

According to another aspect is the temperature-sensitive fluorescent silica particle, wherein the at least two different fluorescent dyes are encapsulated utilizing a physical encapsulation process.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
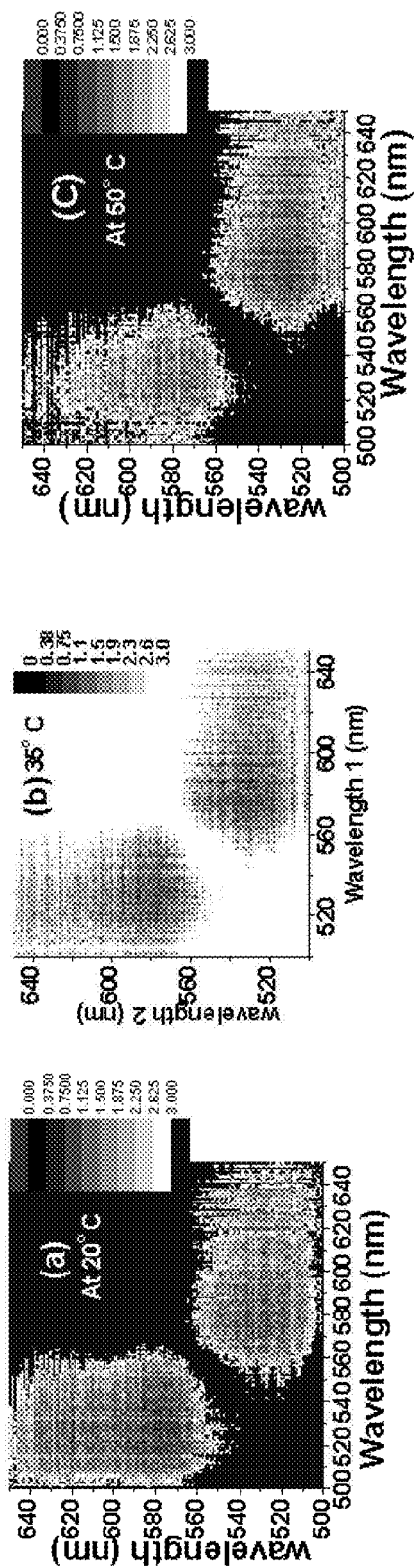
Figure 5A:
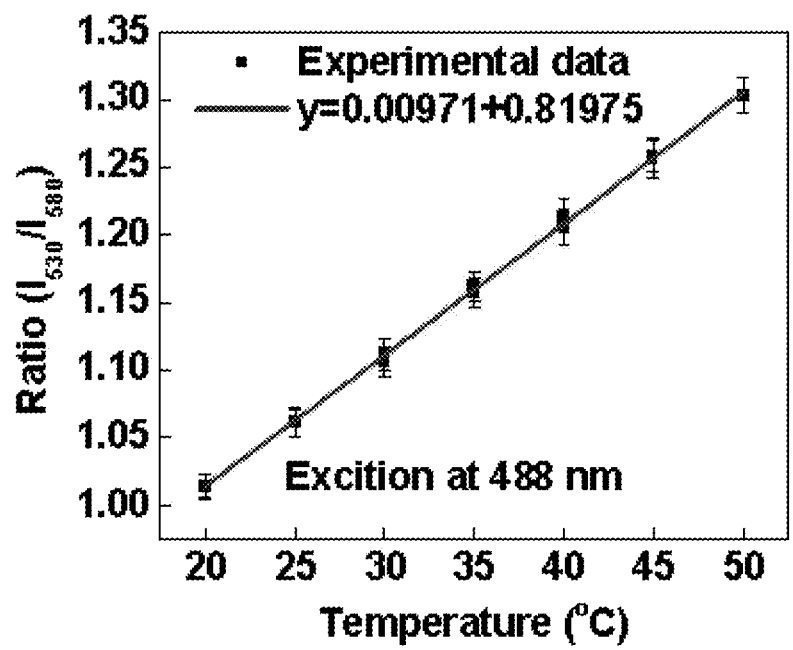
Figure 5B:
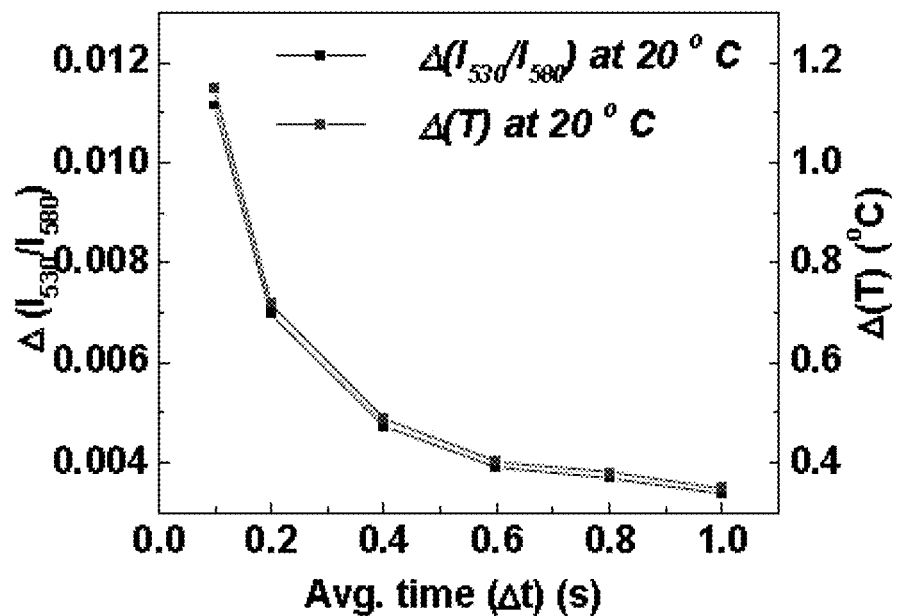
Figure 6:
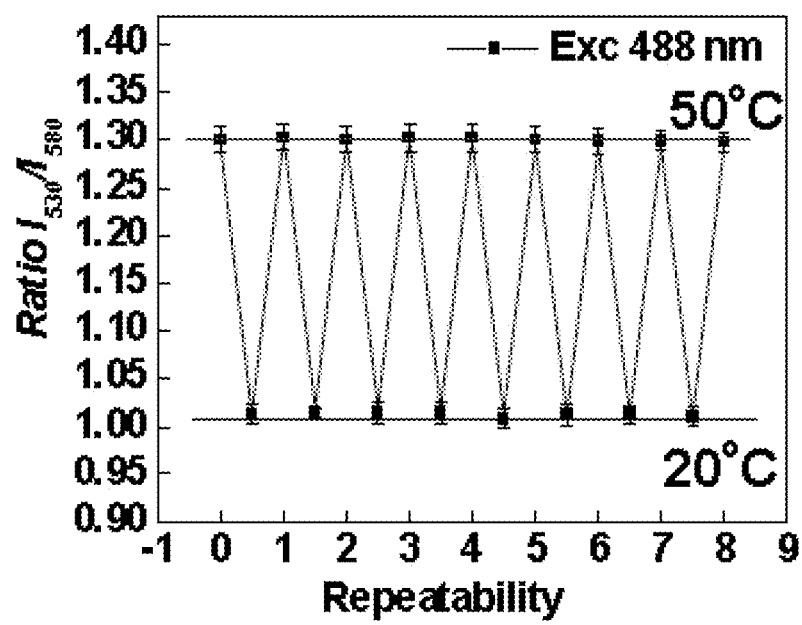

FIG. 4 comprises graphs of intensity ratio for various wavelengths measured at (a) 20° C., (b) 35° C. and (c) 50° C., according to an embodiment;

FIGS. 5A and 5B are graphs of the temperature response of particles encapsulating R6G and RhB dyes with averaging time ($\Delta t$) of 0.1 s in (A), and the intensity ratios of the fluorescent emissions measured at 530 nm to 580 nm in (B), according to an embodiment; and FIG. 6 is a graph of the repeatability of temperature response of fluorescent particles which contain dyes at optimum proportions, according to an embodiment.

DETAILED DESCRIPTION

According to one embodiment are ultrabright fluorescent silica particles that can take stable measurements, and methods of their manufacture. The particles have encapsulated fluorescent substances, some of which change fluorescent characteristics depending on temperature. Each particle works as a thermometer allowing one to measure the temperature of the environment. A ratio of the fluorescent peaks in the fluorescent spectrum of each particle depends on temperature, but is dependent on neither the amount of exciting light nor the size of the particles. Further, the particle size is preferably confined to the range of 8 nm to 100 µm.

The mixing of several dyes within one particle is neither trivial nor obvious, since it is unknown whether, for example, the dyes will be compatible with the synthesis of ultrabright fluorescent particles (i.e., are not destroyed or altered by the synthesis), or whether the dyes will change the final product, the particles. This is particularly problematic because the particles are made of complex composite materials, which form in the process of fine balance of self-assembly. In particular, leakage of the dyes in the case of physical encapsulation may easily change the dye ratio, and consequently, destroys the temperature calibration.

According to an embodiment, the ultrabright fluorescent silica particles and methods of their manufacture are distinguished from prior particles and methods for one or more of the following reasons (in addition to other reasons not explicitly or implicitly set forth below):

Encapsulation of several dyes inside the nanoporous particles in Forster resonance energy transfer (FRET) regime, according to an embodiment. This implies having the dye molecules in very close proximity to each other, while the molecules are not aggregating and quenching the fluorescence. Such behavior is highly nontrivial (cannot be predicted by a skilled in arts), and doesn't still have a reasonable explanation. The encapsulation can be both physical and chemical.

To prevent the dye leakage, a special synthesis is utilized, according to an embodiment. The reasons for lack of dye leakage are not completely understood; it was found by chance after several years of trails and error.

The use of organic silica co-sources with excessive amount of hydrophobic groups, which prevents water from penetrating in the nanochannels, which in turn, prevents the dye leakage. A small amount of hydrophobic groups make the job, while keeping the entire particle still hydrophilic.

Provided below are several examples of silica particles according to an embodiment, including methods of their manufacture. These examples are provided for information only and not meant to limit the scope of the invention.

EXAMPLES

According to one embodiment, tetraethyl orthosilicate (TEOS, Aldrich) were used as silica sources. Cetyltrimethylammonium chloride (CTAC, 25% aqueous solution, Aldrich) was used for as a structure-directing agent, and triethanolamine (TEA, Aldrich) as an additive. The synthesis of particle-thermometers was based on the use of TEA as a replacement of NaOH catalyst. For example, according to one embodiment the relative molar composition of 1.0 TEOS: 0.2 CTACl: 10.4 TEA: 142 $H_2O$ can be used. CTACl surfactant, TEA, left-over silica precursors, and the dyes in final products were removed using a regular dialysis method. The particle's suspension was then dialyzed. The smallest particle size that could be obtained in this method was found to be 8 nm as can be verified by dynamic light scattering, atomic force microscopy, electron microscopy, and other techniques.

An excitation wavelength of 488 nm was used in the temperature-dependence study of fluorescence of the synthesized nanothermometers. Emission maxima of 550 nm for R6G and 575 nm for RhB individual were observed for either free dyes or dye mixture dissolved in water. When encapsulated inside of the nanoporous silica particles, the emission maximum are slightly blue-shifted to 545 nm for R6G and 573 nm RhB.

The temperature dependence of fluorescence was first studied for solutions of single dyes in water. Rather small concentrations 0.1 μM for R6G and 0.04 μM RhB (and a mixture of the two dyes with same concentrations) were investigated. As depicted by the absorbance spectra (not shown), there was no dimerization of the dye observed at those concentrations. The nanothermometers at the concentration of $2.24 \times 10^9$ $mL^{-1}$ were studied for purposes of this example.

To measure the temperature with such nanoparticles, it is convenient to use the ratio of fluorescence at two different wavelengths: the one is weekly dependent on temperature (reference fluorescence), while fluorescence at the other wavelengths is strongly dependent on temperature (sensing fluorescence). This strategy was previously used in LIFT techniques, in which two fluorescent dyes were used in water to measure temperature. The ratio of the fluorescence intensities of the dyes used was calibrated against the temperature to eliminate the effect of the fluctuation of illuminating light intensity (including fluctuation in the background noise from the incident laser). In the case of the particles, such ratio does not also depend on the particles concentration, which is a useful property for practical applications.

Figure 1A:
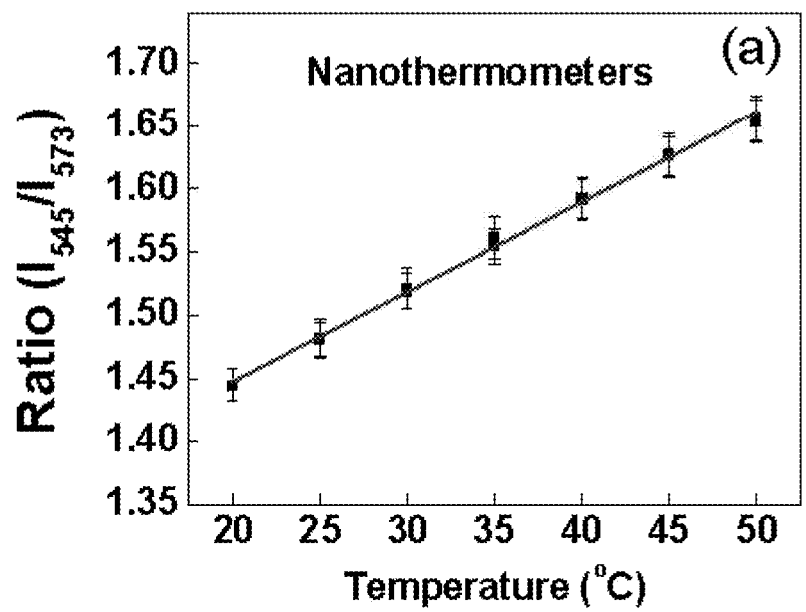
FIGS. 1A and 1B are graphs of the temperature dependence of the ratio of fluorescent intensities, according to an embodiment, for (A) nanothermometers with R6G and RhB dyes encapsulated, and (B) free dyes mixture, where the time of averaging for each fluorescent spectral pixel t=100 ms.
Figure 1B:
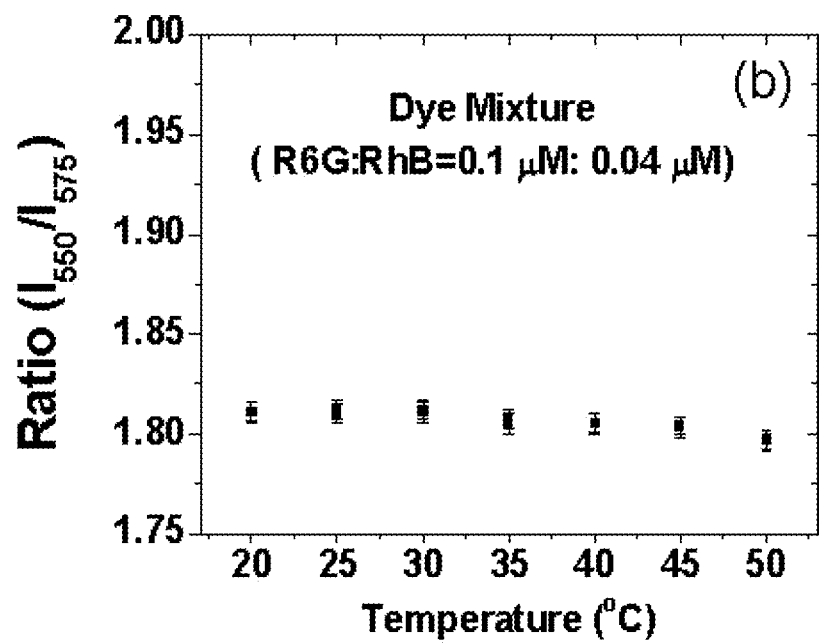
Figure 2:
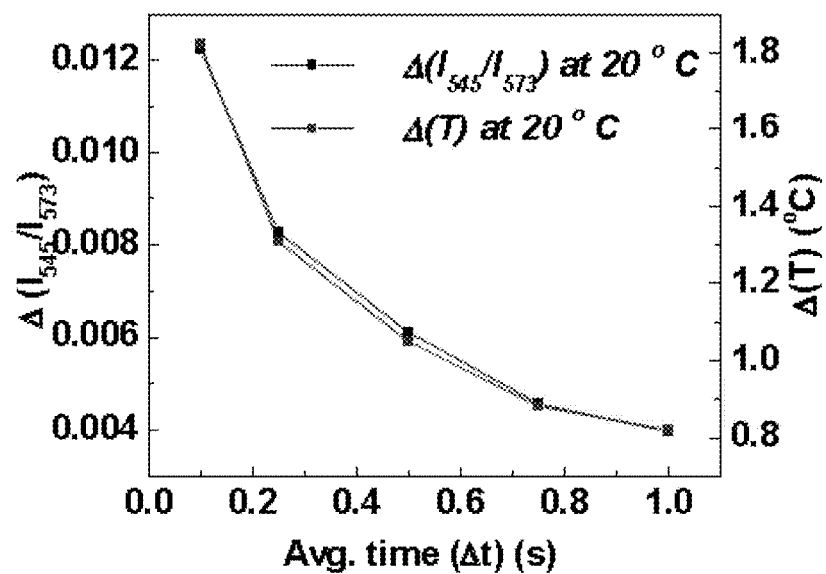
FIG. 2 is a graph of the dependence of the error of the ratio of intensities on the time of averaging for each spectral fluorescent pixel and corresponding uncertainty in the temperature measurements, according to an embodiment.

Referring now to the drawings, there is seen in FIG. 1A a graph of the temperature dependence of the ratio of fluorescent intensities at 545 nm to 573 nm of the nanothermometers excited at 488 nm. There is a fairly linear response when temperature is changed within 20-50° C. in steps of 5° C. Similar measurements for the dye mixture solution show virtually no dependence on temperature, as shown in FIG. 1B. Based on this error bar, one can calculate the uncertainty in temperature measurements. It is rather uniform for the range of temperatures started and found to be 1.8° C.

It should be noted that the standard deviation of the intensities ratio, and consequently, the uncertainty in the temperature measurements, can be decreased by increasing the time of measurements. For example, deviations and uncertainties shown in FIG. 1 were found when the time of fluorescent signal collection $\Delta t = 100$ ms. By increasing the averaging time of the instrument, the uncertainty can be decreased. FIG. 6 shows an example of such decrease when temperature is fixed at $T=20°$ C.

Figure 3:
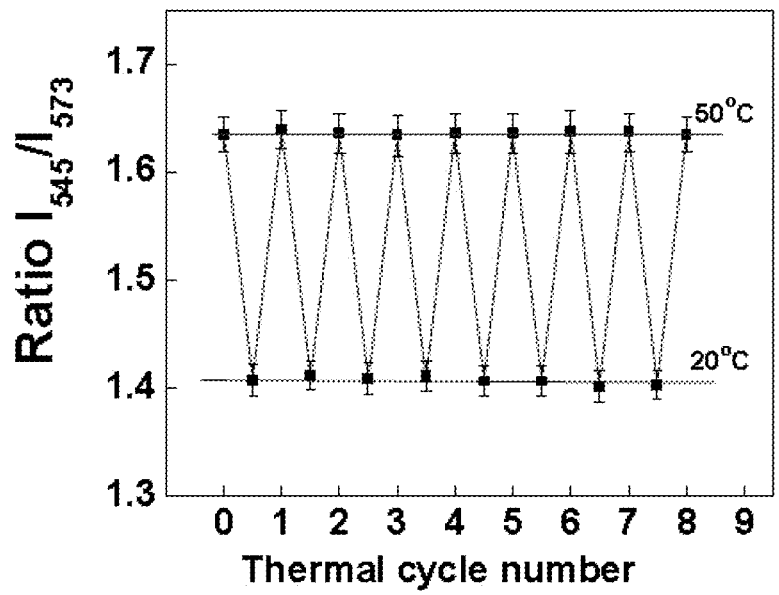
FIG. 3 is a graph of the stability of the nanothermometers measured up to ten full thermal cycles between 20° C. and 50° C., according to an embodiment.

Another important characteristic of the sensors is its stability with respect to multiple changes of temperature. The results of the measurements up to ten full thermal cycles between 20° C. and 50° C. are shown in FIG. 3. One can see a good stability of the synthesized nanothermometers.

It is interesting to investigate questions regarding the maximum possible accuracy of the synthesized nanothermometers. As was noticed previously, the uncertainty in the temperature measurements is related to the error in measurement of the fluorescent ratio. Different wavelengths used to calculate the ratio can demonstrate different sensitivity to the change of temperature. FIG. 4 shows the uncertainty of the temperature for a broad range of wavelengths which could be used in these measurements. Specifically, the temperature uncertainty was found at three particular temperatures: 20° C., 35° C., and 50° C., FIGS. 4 (a), (b) and (c), correspondingly. One can see that the ratio of the intensities taken at 530 nm and 580 nm exhibits the lowest uncertainty of temperature. FIG. 5A shows the temperature response of the ratio taken in these particular wavelengths, and FIG. 5B demonstrates the temperature uncertainty of these measurements as the function of time of averaging for each spectral fluorescent pixel. One can see about twice the improvement compared to the non-optimum ratio shown in FIG. 4. The temperature uncertainty drops to below 0.4° C. when the averaging time, $\Delta t$ is increased to 1.0 s. FIG. 6 shows a good repeatability of the nanothermometers. One can see no change of temperature readings after ten full cycles between 20 and 50° C. even within the less uncertainty of the optimized ratio measurements.

Similar processes can be repeated for the case of micron size particles. For example, using the synthesis of nanoporous discoids. In this case, the differences in comparison to the previous art are one or more of the following (in addition to other reasons):

Encapsulation of several dyes in FRET regime. This implies having the dye molecules in very close proximity to each other, while the molecules are not aggregating. Such behavior is highly nontrivial, and still does not have a reasonable explanation;

The use of organic silica co-sources with excessive amount of hydrophobic groups, which prevents water from penetrating in the nanochannels, which in turn, prevents the dye leakage.

Although the present invention has been described in connection with a preferred embodiment, it should be understood that modifications, alterations, and additions can be made to the invention without departing from the scope of the invention as defined by the claims.

What is claimed is:

1. A method for producing a temperature-sensitive nanoporous fluorescent silica particle, the method comprising the steps of:
   creating a synthesizing solution comprising a silica precursor, at least two different fluorescent dyes, a catalyst, and a structure-directing agent;
   complexing the at least two different fluorescent dyes with said silica precursor to form said temperature-sensitive nanoporous fluorescent silica particles; and
   removing any uncomplexed silica precursor and fluorescent dye from said solution;
   wherein said at least two different fluorescent dyes inside said temperature-sensitive nanoporous fluorescent silica particles are coupled in Forster resonance energy transfer (FRET);
   wherein a ratio of fluorescent peaks in a fluorescent spectrum of said temperature-sensitive silica particle is dependent upon ambient temperature; and
   wherein said temperature-sensitive silica particles are between 8 nm to 100 μm.

2. The method of claim 1, wherein at least one of said at least two different fluorescent dyes is sensitive to a change in ambient temperature, and at least one of said at least two different fluorescent dyes is not sensitive to a change in ambient temperature.

3. A temperature-sensitive nanoporous fluorescent silica particle generated according to the method of claim 1, wherein said temperature-sensitive fluorescent silica particle is between 2 to 50 nm.

4. The temperature-sensitive fluorescent silica particle of claim 3, wherein at least one of said at least two different fluorescent dyes is sensitive to a change in ambient temperature, and at least one of said at least two different fluorescent dyes is not sensitive to a change in ambient temperature.

5. The temperature-sensitive fluorescent silica particle of claim 3, wherein each of said at least two different fluorescent dyes are covalently bonded to a silica matrix.

6. The temperature-sensitive fluorescent silica particle of claim 3, wherein said at least two different fluorescent dyes are encapsulated utilizing a physical encapsulation process.

7. The method of claim 1, wherein said catalyst is either NaOH or TEA.

8. The method of claim 1, wherein said synthesizing solution has the following relative molar composition: 1.0 TEOS: 0.2 CTACl: 10.4 TEA: 142 $H_2O$.

9. The method of claim 1, wherein at one of said at least two different dyes is R6G.

10. The method of claim 1, wherein at one of said at least two different dyes is RhB.

11. The method of claim 3, wherein the silica precursor contains one or more hydrophobic groups.

* * * * *